United States Patent
D'Amato et al.

(10) Patent No.: US 8,914,134 B2
(45) Date of Patent: Dec. 16, 2014

(54) SYSTEMS AND METHODS FOR PREDICTING TRANSIENT OPERATIONAL CHARACTERISTICS OF A POWER PLANT

(75) Inventors: Fernando Javier D'Amato, Niskayuna, NY (US); Christopher Long, Greenville, SC (US); Matthew Mosley, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 430 days.

(21) Appl. No.: 13/292,907

(22) Filed: Nov. 9, 2011

(65) Prior Publication Data

US 2013/0116830 A1 May 9, 2013

(51) Int. Cl.
| | |
|---|---|
| *G05B 13/02* | (2006.01) |
| *G05D 3/12* | (2006.01) |
| *G06F 17/18* | (2006.01) |
| *G06F 19/00* | (2011.01) |
| *G06F 11/30* | (2006.01) |
| *G06F 7/60* | (2006.01) |
| *G06F 17/10* | (2006.01) |
| *G06F 15/18* | (2006.01) |
| *G06N 3/08* | (2006.01) |
| *H02J 3/00* | (2006.01) |
| *G05B 11/00* | (2006.01) |

(52) U.S. Cl.
CPC .............. *G05B 11/00* (2013.01); *G05B 13/026* (2013.01); *H02J 3/00* (2013.01)
USPC ................... 700/44; 700/30; 700/32; 700/47; 700/287; 702/181; 702/183; 703/1; 703/2; 706/21; 706/25

(58) Field of Classification Search
CPC .. G05B 11/00; G05B 13/027; G05B 13/0275; G05B 13/028; G05B 13/0285; G05B 13/029; G05B 13/0295; G05B 13/041; G05B 13/042; G05B 13/047; G05B 13/048; G05B 15/00; G05B 17/00; G05B 19/00; G05B 23/00; G06N 7/00
USPC ....................... 700/28–33, 44, 47–49, 79, 80, 700/286–288, 291; 702/127, 176–183, 187, 702/189; 703/1, 2, 6, 7, 9, 11, 12; 706/12, 706/13, 15, 16, 19, 21, 25
See application file for complete search history.

(56) References Cited

U.S. PATENT DOCUMENTS 5,331,579 A * 7/1994 Maguire et al. ................... 703/2
5,386,373 A    1/1995 Keeler et al.

(Continued)

OTHER PUBLICATIONS

Kim, "Computerized Systems for On-line Management of Failures: A State-of-the-art Discussion of Alarm Systems and Diagnostic Systems Applied in the Nuclear Industry", Reliability Engineering & System Safety, vol. 44, Issue 3, pp. 279-295,1994.

(Continued)

*Primary Examiner* — Crystal J Barnes-Bullock
(74) *Attorney, Agent, or Firm* — Ann M. Agosti

(57) ABSTRACT

Certain embodiments of the invention may include systems and methods for predicting transient operational characteristics of a power plant. According to an example embodiment of the invention, a method is provided for predicting transient operational characteristics of a power plant. The method can include receiving operating information associated with the power plant; using a power plant dynamics model for determining a current operating state of the power plant based at least in part on the received operating information; and using the power plant dynamics model and a power plant controls model for predicting one or more future operating parameters associated with power plant based at least in part on the determined current operating state and the received operating information.

17 Claims, 5 Drawing Sheets

(56) References Cited

U.S. PATENT DOCUMENTS

| | | | |
|---|---|---|---|
| 5,621,668 A * | 4/1997 | Nakata | 702/176 |
| 6,056,781 A * | 5/2000 | Wassick et al. | 703/12 |
| 6,269,351 B1 * | 7/2001 | Black | 706/15 |
| 6,865,509 B1 | 3/2005 | Hsiung et al. | |
| 6,868,310 B2 | 3/2005 | Nasman et al. | |
| 7,328,128 B2 | 2/2008 | Bonanni et al. | |
| 7,580,767 B2 | 8/2009 | MacDonald et al. | |
| 7,584,024 B2 | 9/2009 | Wroblewski et al. | |
| 7,933,762 B2 | 4/2011 | Pinto et al. | |
| 8,065,022 B2 * | 11/2011 | Minto et al. | 700/29 |
| 8,433,450 B2 * | 4/2013 | Francino et al. | 700/288 |
| 2004/0249480 A1 | 12/2004 | Lefebvre et al. | |
| 2007/0055392 A1 | 3/2007 | D'Amato et al. | |
| 2008/0021675 A1 * | 1/2008 | Fehr et al. | 702/182 |
| 2009/0222108 A1 * | 9/2009 | Lou et al. | 700/29 |
| 2009/0292436 A1 | 11/2009 | D'Amato et al. | |
| 2012/0049516 A1 * | 3/2012 | Viassolo | 290/44 |
| 2012/0083933 A1 * | 4/2012 | Subbu et al. | 700/291 |
| 2012/0143382 A1 * | 6/2012 | Lou | 700/287 |

OTHER PUBLICATIONS

Zhoua et al., Development of an Intelligent Decision Support System for Air Pollution Control at Coal-fired Power Plants, Expert Systems with Applications, vol. 26, Issue 3, pp. 335-356, Apr. 2004.

* cited by examiner

SYSTEMS AND METHODS FOR PREDICTING TRANSIENT OPERATIONAL CHARACTERISTICS OF A POWER PLANT

FIELD OF THE INVENTION

This invention generally relates to power plants, and in particular to systems and methods for predicting transient operational characteristics of a power plant.

BACKGROUND OF THE INVENTION

Electrical power plants include many complex systems and subsystems with interactions between components that can require careful or orchestrated control in order to reduce operating costs, extract maximum return on investments, and operate within safe limits. Such control may rely on a dependable monitoring of equipment and prediction of outcomes. Models using look-up-tables have been used for monitoring or predicting operations of certain power generation and transmission systems, but such predictions based on static or linear modeling may not provide predictions with sufficient resolution, detail, or accuracy.

BRIEF SUMMARY OF THE INVENTION

Some or all of the above needs may be addressed by certain embodiments of the invention. Certain embodiments of the invention may include systems and methods for predicting transient operational characteristics of a power plant.

According to an example embodiment of the invention, a method is provided for predicting transient operational characteristics of a power plant. The method can include receiving operating information associated with the power plant; using a power plant dynamics model for determining a current operating state of the power plant based at least in part on the received operating information; and using the power plant dynamics model and a power plant controls model for predicting one or more future operating parameters associated with power plant based at least in part on the determined current operating state and the received operating information.

According to another example embodiment, a system is provided for predicting and controlling behavior associated with a power plant, the system includes at least one memory for storing data and computer-executable instructions; and at least one processor configured to access the at least one memory. The at least one processor is further configured to execute the computer-executable instructions for: modeling dynamics associated with a power plant; modeling controls associated with the power plant; receiving operating information associated with the power plant; determining, by modeling the dynamics, a current operating state of the power plant based at least in part on the received operating information; and predicting, by modeling the dynamics and controls, one or more future operating parameters associated with power plant based at least in part on the determined current operating state and the received operating information.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE INVENTION

Figure 1:
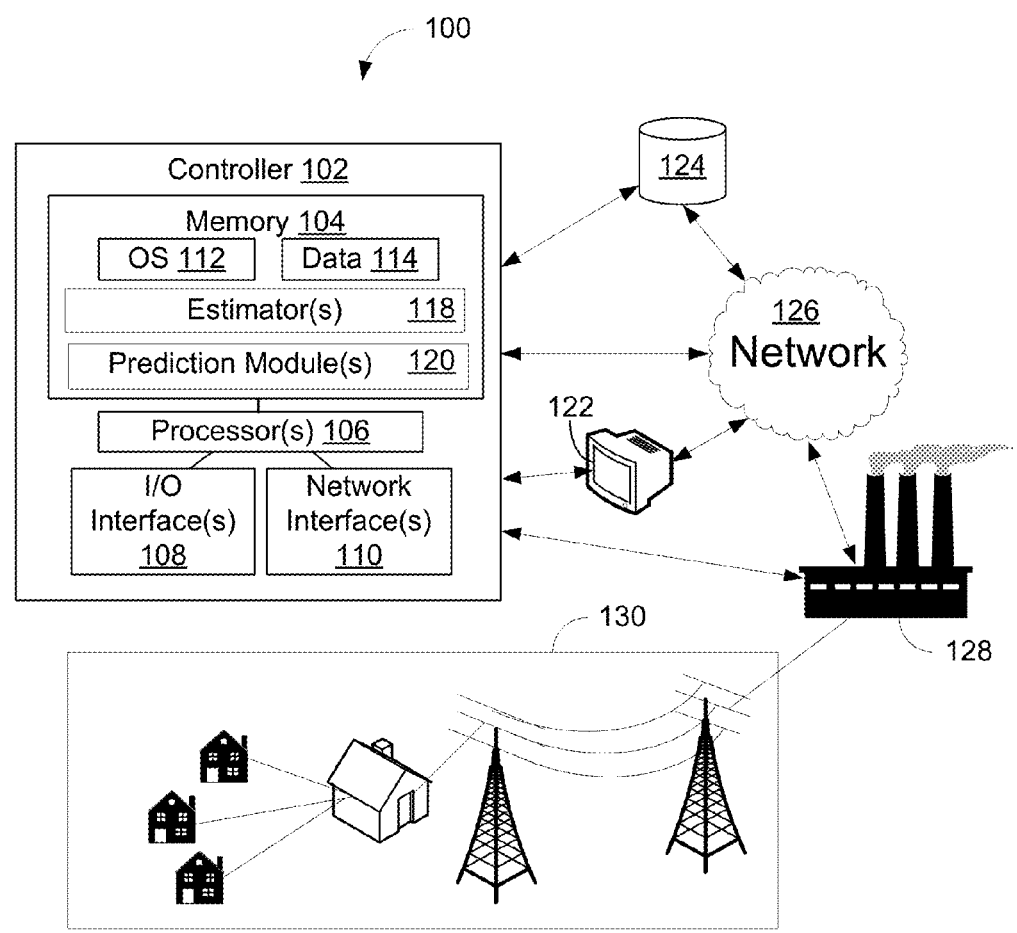
FIG. 1 is a block diagram of an illustrative power system prediction and control system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable modeling dynamics associated with a plant to help operators make informed decisions. Example embodiments may provide information that can assist with startup, operation or shutdown of certain components and systems. According to certain example embodiments, a dynamics model using differential equations may be utilized for predicting or estimating certain behaviors, outputs, temperatures, etc. associated with the operation of the power plant.

According to example embodiments, various aspects of plant operation may benefit from a dynamics model as described herein. For example, before operation of a power plant, a model may be utilized to predict operational scenarios so that informed decisions can be made for bringing a plant on-line. Input information that may be included in the model (or that may be predicted based on other input) may include, for example, weather forecasts, pricing forecasts, fuel costs, emissions, operating costs, etc. In an example embodiment, such information may be utilized to aid bidding or to reduce startup costs. Another aspect, according to an example embodiment, may utilize the modeled or predicted information to control or reduce costs during the operation of the plant.

According to example embodiments, differential equations may be utilized in conjunction with real-time operational data and/or other input parameters to predict when a power generation system should be started. For example, to reduce operating costs or to minimize wear, a generator may undergo a startup sequence that can take up to several hours before it is ready to be brought on-line. Example embodiments may provide information for when to initiate the startup sequence. In other example embodiments, dynamics associated with multiple generators or gas turbines may be modeled to determine an optimum sequence for startup.

According to example embodiments, an operations advisor may include a system and method that provides anticipated and/or hypothetical information concerning current or future power plant operations including startups, shut downs or load changes. Example embodiments can provide information to the user that can be utilized to improve plant operations and missions. According to example embodiments, the anticipated, predicted, and/or hypothetical information provided can include process signals. Process signals, for example, can include time traces of power output, pressures, temperatures and flows of fluid streams. According to example embodiments, the anticipated, predicted, and/or hypothetical information provided can include economic indicators. Economic indicators, for example, may include operation costs, maintenance costs, expenditure, profit from energy or ancillary service markets, etc. In accordance with example embodiments, plant management and operations may require multiple decisions ranging from short-term processes (for example, answering requests from ancillary services) to medium-term processes (for example, time to start daily operations) to long-term processes (for example, defining maintenance schedules and plant missions).

According to example embodiments, the operations advisor may provide two types of services for the operator. For example, one service may include predicting the behavior of the plant from the current time through a pre-specified time horizon, and providing operating metrics including fuel costs, time to complete startup or shutdown, life consumed at various components, economic revenues and profit. According to an example embodiment, the second service may include accepting a user choice of performance criterion and evaluating the same metrics as in the first service for multiple alternative operating scenarios, and recommending the most convenient operating decision according to the chosen performance criterion. In an example embodiment, the set of performance criterion may include minimizing time to complete an operation, minimizing operation costs, minimizing emissions, keeping life expenditure rate below a specified level, and/or maximizing profit to complete operation.

According to example embodiments the operations advisor may include a set of computer programs for execution within a computing unit. In an example embodiment, an operations advisor may receive a collection of plant operational data obtained from sensors or from market information. In addition, the operations advisor may include a graphical interface environment to enable interaction with the plant operator. Example embodiments of the invention, an operations advisor can communicate with the plant controllers through a user interface, or directly through suitable communication channels. According to other example embodiments, machine-readable code or programs in the computing units may utilize a mathematical model of plant operations to predict the near future behavior and economic indicators. In one operating mode, and according to an example embodiment, the operations advisor may continuously update the current operational and market data and may further await user instructions to launch a prediction for a specific time duration. According to an example embodiment, one or more predictions may be computed, and the resulting evaluation metrics may be displayed to the operator through the user interface, or may be utilized for automatic control of certain processes associated with a plant.

In another operating mode, and in accordance with example embodiments, the operations advisor may launch predictions automatically at specified time intervals, without user intervention, and may provide an update of the corresponding operation metrics in the user interface to the operator. In yet another operating mode, and according to another example embodiment, the user may choose a performance criterion and an operating action from an existing collection of available options in the user interface. According to example embodiments, the computer programs, which include machine-readable code, may then launch several fast simulations for different operating scenarios, evaluate the corresponding performance metrics, and may select the operating scenario that gives an optimum performance. In an example embodiment, the result may be shown in the user interface as a recommended action to the operator. In an example embodiment, an optimum operating scenario may be automatically chosen with a result sent to the plant controller to make any further decisions or to take any further actions manually. In an example embodiment, an optimum operating scenario may be automatically chosen with a result sent to the plant controller for proceeding automatically without operator intervention.

According to an example embodiment, during power plant operations, there may be instances in which the operator can select different courses of action having operating performance results that may be difficult to evaluate a priori. For example, an operating decision problem may include a power plant startup time decision. For example, in day-ahead energy market scenarios, a commitment may be made to deliver certain electrical power at a specified time on the following day. Depending on the thermal state of the plant, the startup process needed to meet the grid commitments may vary significantly. Moreover, the volatility of some external conditions such as ambient temperature, electric power and fuel markets, and the compliance with local regulations may make it convenient to extend or accelerate the startup process, depending on the performance criterion of choice. According to example embodiments, several factors may be balanced to determine an optimum time to initiate the startup, including fuel consumed, component life and consumption, penalties for being late to a commitment, or operating costs for being early to the commitment.

Certain example embodiments may provide information for the most convenient time and thermodynamic conditions to blend steam from different steam generators. Certain example embodiments may provide information for optimal or near-optimal time to start additional gas turbines in combined cycle plants with more that one gas turbine. For example, blending steam from different steam generators refers to the process in which the steam turbine transitions between receiving steam from a reduced set of steam generators to adding steam from one or more additional generators. According to an example embodiment, before the blending time, steam from additional steam generators may be redirected to a condenser without being expanded in the steam turbine. From the thermodynamic efficiency point of view, there is an incentive to complete the blending as soon as possible. However, completing the blending early in the startup process when the steam pressures are relatively low may make the steam drum pressures difficult to control, and may create potential risks that may require operator intervention or expensive plant trips by service personnel, for example, if drum levels exceed allowable limits.

Another issue that may be addressed with certain embodiments of the invention includes the timing for starting of additional gas turbines. For example, starting the additional gas turbine too early may result in unnecessary fuel consumption, and starting it too late may delay the startup process potentially incurring in additional operating costs.

Various controller, estimators, and prediction modules may be utilized for predicting transient operational characteristics of a power plant, according to example embodiments of the invention, and will now be described with reference to the accompanying figures.

FIG. 1 illustrates an example power system prediction and control system 100, according to an example embodiment of the invention. In an example embodiment, the system 100 may include a controller 102 for interfacing with various components associated with the power system. For example, the controller 102 may be in communication with the plant 128, either directly or via a network 126. According to an example embodiment, the plant may provide power to a power distribution network 130. In an example embodiment, the controller 102 may store and/or retrieve data from external data storage 124, either directly or through the network 126. In an example embodiment, a local or remote workstation 122 may be in communication with the controller 102 and/or the network 126.

According to an example embodiment, the controller 102 may include a memory 104 and one or more processors 106 in communication with the memory 104. In an example embodiment, the controller 102 may include one or more input/output interfaces 108. According to an example embodiment, the controller 102 may include one or more network interfaces 110. In accordance with example embodiments of the invention, the memory 104 may include an operating system 112 and data 114. In an example embodiment, the memory 104 may include one or more estimator modules 118. In an example embodiment, the memory 104 may include one or more prediction modules 120. For example, the one or more estimator modules 118 and/or the one or more prediction modules 120 may include computer readable code that may provide instructions to the one or more processor 106 for executing estimation algorithms or simulation algorithms. In an example embodiment, the one or more estimator modules 118 and/or the one or more prediction modules 120 may include computer readable code that may provide instructions to the one or more processor 106 for processing data for estimating or predicting certain outcomes associated with the power plant 128 or power distribution 130. According to an example embodiment, estimating or predicting certain outcomes associated with the power plant 128 or power distribution 130 may be based on inputs or measured past data.

Figure 2:
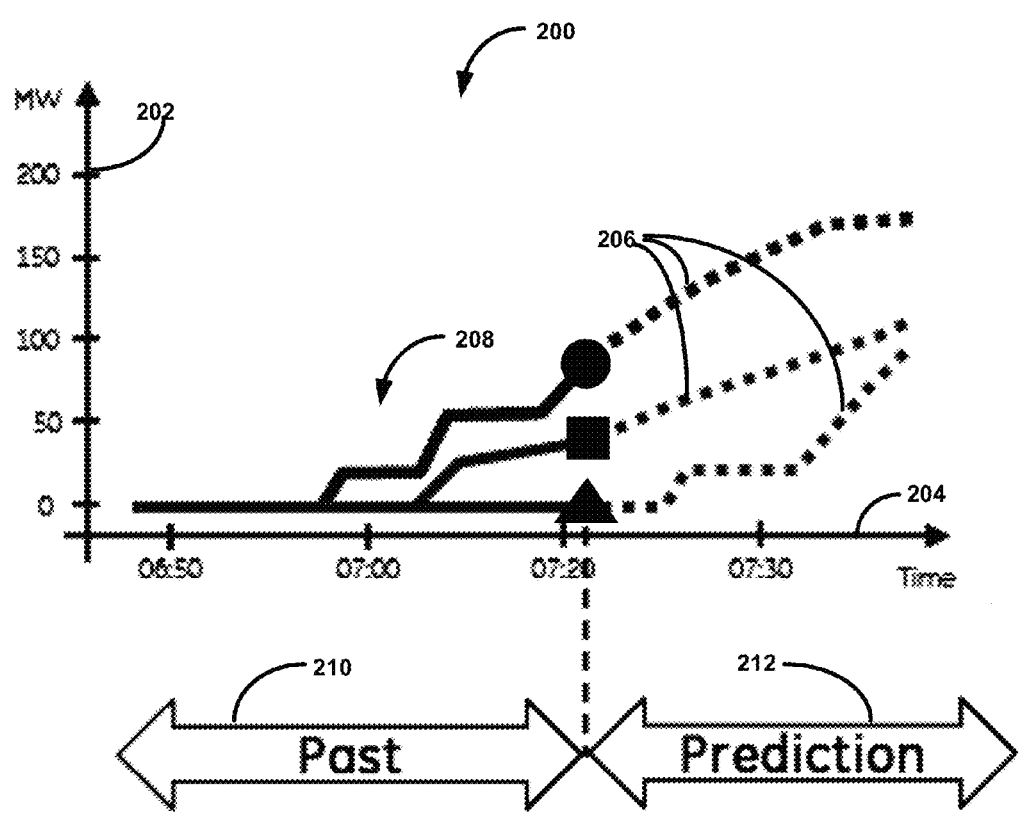
FIG. 2 is an illustrative example measurement and prediction chart, according to an example embodiment of the invention.

FIG. 2 depicts a chart 200 of example processes associated with a power plant, according to example embodiments of the invention. In this example, the chart 200 may illustrate plotting and/or monitoring power output 202 vs. time 204. In an example embodiment, predicted values 206 may be determined based, at least in part, on past measured values 208, input parameters, and modeling of the physics of the system. According to example embodiments, the chart 200 may represent both past time 210 and predicted time 212. According to example embodiments, the model may provide one or more predicted values 206 so that predicted or estimated results from multiple scenarios may be evaluated, considered, and compared.

Figure 3:
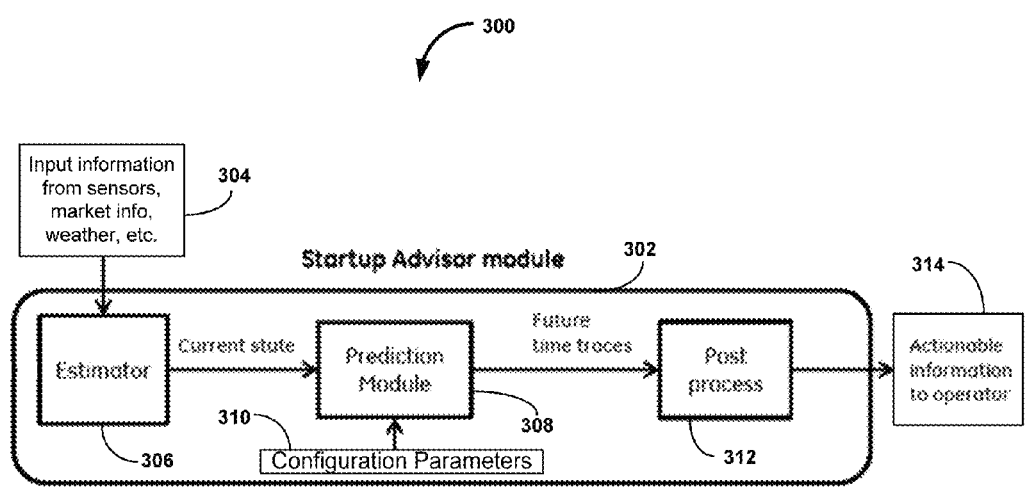
FIG. 3 is a block diagram of an illustrative start advisor example, according to an example embodiment of the invention.

FIG. 3 depicts a startup advisor example 300, according to example embodiments. In an example embodiment, a startup advisor module 302 may be utilized for receiving input information 304 and for providing output information 314. In an example embodiment, the startup advisor module 302 may be included as one of the modules in the power system prediction and control system (as in 118 or 120 of FIG. 1). In an example embodiment, input information 304 may include raw or processed sensor information, either online or offline. According to example embodiments, the input information 304 may include weather forecasts, pricing forecasts, fuel costs, emissions, operating costs, etc. According to example embodiments of the invention, the startup advisor module 302 may forecast market conditions and/or disturbances under various hypothetical future scenarios.

In an example embodiment, the startup advisor module 302 may include an estimator 306. According to an example embodiment, the estimator 306 may include a transient model of the system. According to an example embodiment, the estimator 306 may include estimation algorithms, including one or more Kalman filters. According to an example embodiment, the estimator 306 may calculate one or more current states of a plant, including temperatures, pressures, flows, enthalpies, etc. across the plant.

In an example embodiment, the startup advisor module 302 may include a prediction model 308. According to an example embodiment, the prediction model 308 may include a transient model of the system. According to an example embodiment, the prediction model 308 may include a model of control algorithms. According to an example embodiment, the prediction model 308 may receive configuration parameters 310 to tune the plant closed loop behavior. According to example embodiments, the configuration parameters may be utilized to represent existing controls, such as purge time, acceleration rates, initial metal temperatures, etc. According to example embodiments, the configuration parameters may be utilized to represent plant characteristics, such as drum sizes, turbine capacity, valve characteristics, etc. According to example embodiments, the configuration parameters may be utilized to represent simulation characteristics, such as prediction time, time steps, calculation frequency, etc. According to an example embodiment, the prediction model 308 may include a fast solver that may utilize differential equations or differential/algebraic equations. According to an example embodiment, the prediction model 308 may calculate one or more time traces of key plant or controller signals.

In an example embodiment, the startup advisor module 302 may include a post process module 312. According to an example embodiment, the post process module 312 may compute predicted key operational parameters based on one or more time traces of fuel consumption, life consumption, emissions, time history of plant power, transient performance of plant components, or distance to operational constraints.

Figure 4:
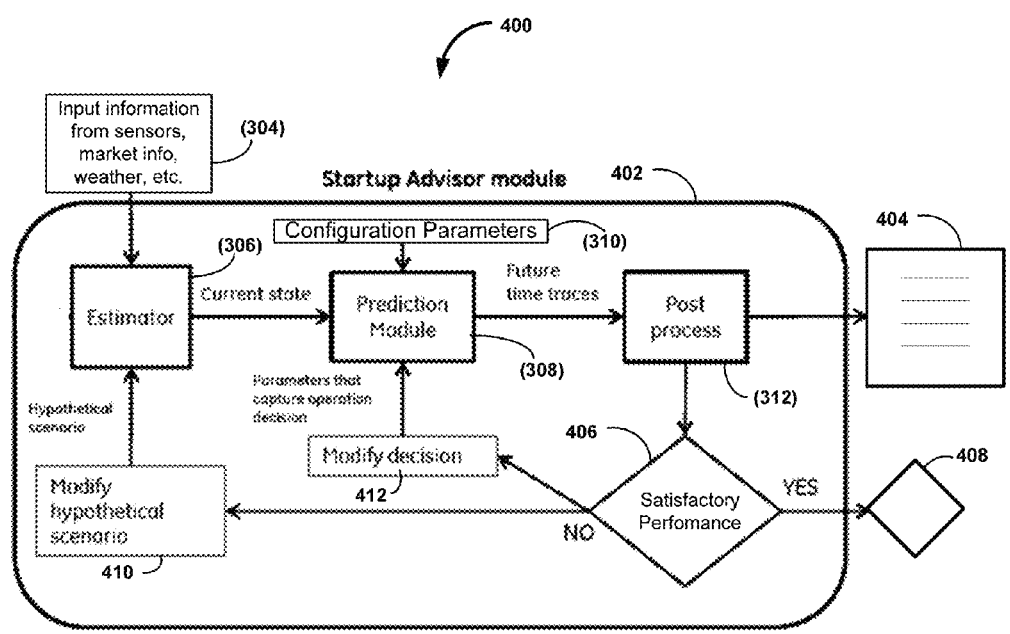
FIG. 4 is a block diagram of an illustrative startup advisor example, according to an example embodiment of the invention.

FIG. 4 depicts another version of the startup advisor 400, according to an example embodiment of the invention. In this example embodiment, similar processes as those covered in FIG. 3 may be performed with additional modules, steps, or processes to provide decision recommendations. For example, a startup advisor such as a decision maker 402 may provide a decision table 404. In an example embodiment, the decision table 404 may tabulate performance of various decision scenarios for comparison. In an example embodiment, the startup advisor such as a decision maker 402 may include an evaluation module 406 that may determine which of the decisions provided by the post process module 312 are satisfactory. In an example embodiment, if one of the decisions provides satisfactory estimated performance, a decision recommendation 408 may be presented as an output. In an example embodiment, the evaluation module 406 may determine that none of the decisions will produce satisfactory performance, and additional processes may be initiated. According to an example embodiment, a decision may be modified at block 412 to provide parameters that represent an operation decision for input to the prediction module 308. According to an example embodiment, the hypothetical scenario 410 may be modified, and parameters may be passed to an estimator 306. According to example embodiments, the hypothetical scenario 410 may provide parameters that may override either the market/weather or sensor information 304. According to an example embodiment, the decision recommendation 408 may be displayed to an operator. According to an example embodiment, the decision recommendation 408 may be utilized for automated decisions and control.

Figure 5:
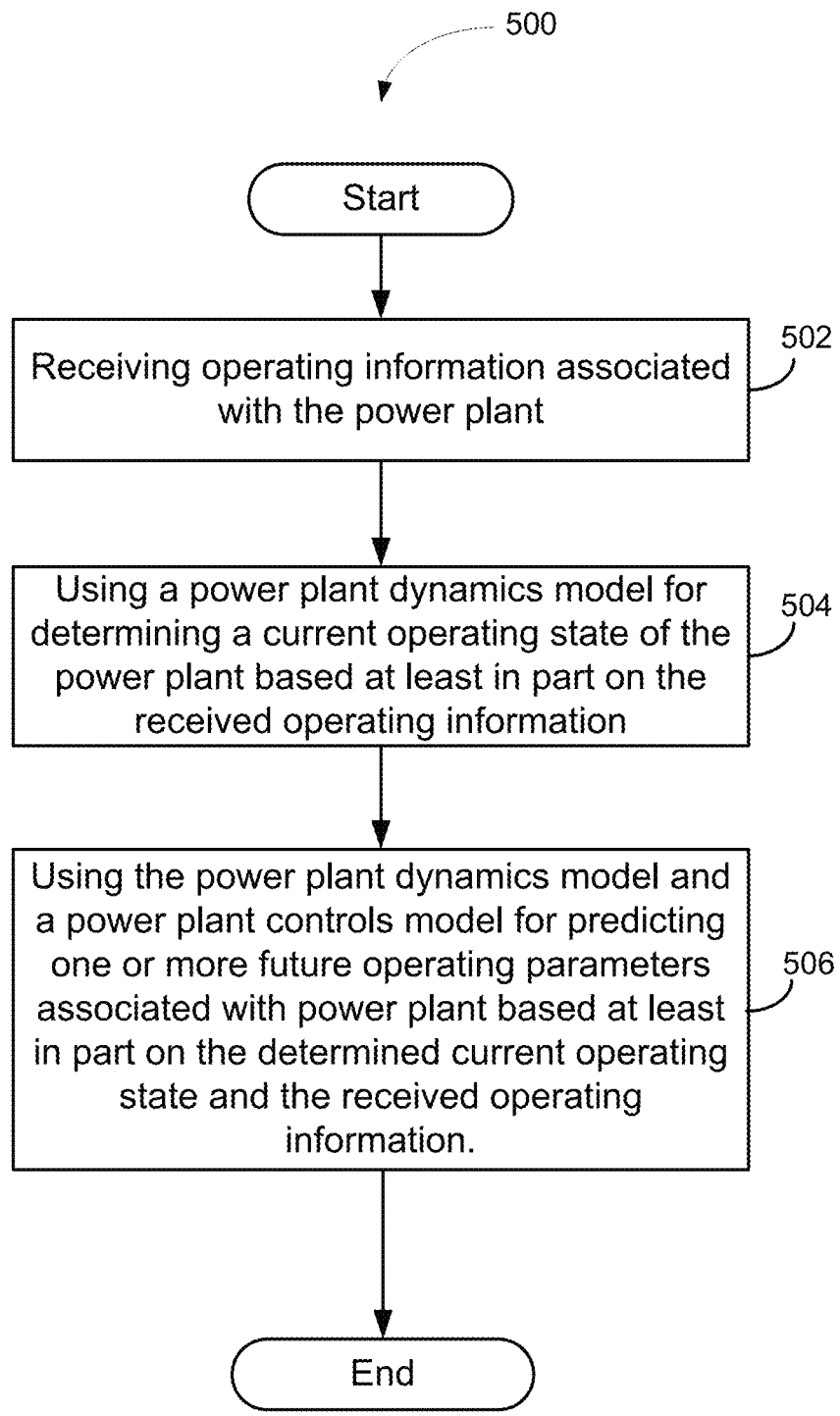
FIG. 5 is a flow diagram of an example method according to an example embodiment of the invention.

An example method 500 for predicting transient operational characteristics of a power plant will now be described with reference to the flowchart of FIG. 5. The method 500 starts in block 502, and according to an example embodiment of the invention includes receiving operating information associated with the power plant. In block 504, the method 500 includes using a power plant dynamics model for determining a current operating state of the power plant based at least in part on the received operating information. In block 506, the method 500 includes using the power plant dynamics model and a power plant controls model for predicting one or more future operating parameters associated with power plant based at least in part on the determined current operating state and the received operating information. The method 500 ends after block 506.

According to example embodiments, the dynamics model includes a representation of physical operating parameters associated with the power plant using one or more of differential equations or differential algebraic equations, wherein the controls model includes a model of closed-loop behavior of at least one operating process associated with the power plant 128. According to example embodiments, the current operating state includes one or more of temperatures, pressures, flows, enthalpies, voltage, reactive power, chemical compositions, mechanical torque, mechanical power, or speeds. According to example embodiments, receiving operating information 304 includes receiving one or more of operating configuration parameters, sensor information, pricing information, or environmental information. According to example embodiments, predicting the one or more future operating parameters comprises predicting one or more of: fuel consumption, life consumption, water consumption, chemical consumption, emissions, corresponding time histories, transient performance of plant components, or margin to operational constraints. Example embodiment further include generating actionable operating information based at least in part on predicting the one or more future operating parameters.

An example embodiment includes predicting 308, by the dynamics and controls models, one or more future operating parameters based at least in part on one or more controllable scenarios, wherein the one or more controllable scenarios include one or more of: time to start each generating unit in the power plant, time to start blending steam from different steam generation units in a common header, rate at which blending occurs, time to start rolling turbine shafts, acceleration rate to reach rated speed, timing of chemical dosing, magnitude of chemical dosing, time to start cooling fans, cooling fan speed, time to close a breaker, loading rate of one or more turbines, and time to transition switch operating modes. Example embodiments further include automatically controlling the power plant based at least in part on an evaluation of 406 the predicted future operating parameters.

According to an example embodiment, a system is provided for predicting and controlling behavior associated with a power plant 128. The system can include at least one memory 104 for storing data 114 and computer-executable instructions 118, 120; and at least one processor 106 configured to access the at least one memory 104 and further configured to execute the computer-executable instructions 118, 120 for: modeling dynamics associated with a power plant 128; modeling controls associated with the power plant 128; receiving operating information 304 associated with the power plant 128; determining, by modeling the dynamics, a current operating state of the power plant 128 based at least in part on the received operating information; and predicting 308, by modeling the dynamics and controls, one or more future operating parameters associated with power plant 128 based at least in part on the determined current operating state and the received operating information 304. In an example embodiment, modeling the dynamics include representing physical operating parameters associated with the power plant with one or more of differential equations or differential algebraic equations. In an example embodiment, modeling controls include a modeling closed-loop behavior of at least one process associated with the power plant 128.

In an example embodiment, the current operating state includes one or more of temperatures, pressures, flows, enthalpies, voltage, reactive power, chemical compositions, mechanical torque, mechanical power, or speeds. In an example embodiment, receiving operating information 304 comprises receiving one or more of configuration parameters, sensor information, pricing information, or environmental information. In an example embodiment, predicting the one or more future operating parameters comprises predicting one or more of: fuel consumption, life consumption, water consumption, chemical consumption, emissions, corresponding time histories, transient performance of plant components, or margin to operational constraints.

In an example embodiment, the system can be further configured for providing actionable operating information to an operator based at least in part on predicting the one or more future operating parameters. In an example embodiment, the system can be further configured for predicting 308, by the dynamics and controls models, one or more future operating parameters based at least in part on one or more controllable scenarios. In an example embodiment, the one or more controllable scenarios include one or more of: time to start each generating unit in the power plant, time to start blending steam from different steam generation units in a common header, rate at which blending occurs, time to start rolling turbine shafts, acceleration rate to reach rated speed, timing of chemical dosing, magnitude of chemical dosing, time to start cooling fans, cooling fan speed, time to close a breaker, loading rate of one or more turbines, and time to transition switch operating modes. In an example embodiment, the system may be configured for automatically controlling the power plant based at least in part on an evaluation of 406 the predicted future operating parameters.

Certain example embodiments provide predicted magnitudes of certain operating parameters. Example embodiments may also predict future operating state. For example, the operating state may include a future value (such as temperature, pressure, etc.) for a particular plant component. According to example embodiments, operating parameters can include operating states or predicted operating parameters and operating states.

According to example embodiments, certain technical effects can be provided, such as creating certain systems and methods that provide physical and economical information to an operator ahead of time so that improved or optimized decisions may be made in a consistent manner. Example embodiments of the invention can provide the further technical effects of providing systems and methods for reducing fuel consumption associated with a gas turbine.

In example embodiments of the invention, the power system prediction and control system 100 may include any number of hardware and/or software applications that are executed to facilitate any of the operations. In example embodiments, one or more I/O interfaces may facilitate communication between the power system prediction and control system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the power system prediction and control system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the power system prediction and control system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the power system prediction and control system 100 with more or less of the components illustrated in FIG. 1.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
receiving operating information associated with the power plant;
using a power plant dynamics model for determining a current operating state of the power plant based at least in part on the received operating information; and
using the power plant dynamics model and a power plant controls model for predicting one or more future operating parameters associated with power plant based at least in part on the determined current operating state, the received operating information, and multiple controllable scenarios, wherein the multiple controllable scenarios include two or more of: time to start each generating unit in the power plant, time to start blending steam from different steam generation units in a common header, rate at which blending occurs, time to start rolling turbine shafts, acceleration rate to reach rated speed, timing of chemical dosing, magnitude of chemical dosing, time to start cooling fans, cooling fan speed, time to close a breaker, loading rate of one or more turbines, and time to transition switch operating modes;
generating actionable operating information based at least in part on the one or more future operating parameters; and
operating the power plant based at least in part on the actionable operating information.

2. The method of claim 1, wherein the dynamics model comprises a representation of physical operating parameters associated with the power plant using one or more of differential equations or differential algebraic equations.

3. The method of claim 1, wherein the controls model comprises a model of closed-loop behavior of at least one operating process associated with the power plant.

4. The method of claim 1, wherein the current operating state comprises one or more of temperatures, pressures, flows, enthalpies, voltage, reactive power, chemical compositions, mechanical torque, mechanical power, or speeds.

5. The method of claim 1, wherein receiving operating information comprises receiving one or more of operating configuration parameters, sensor information, pricing information, or environmental information.

6. The method of claim 1, wherein predicting the one or more future operating parameters comprises predicting one or more of: fuel consumption, life consumption, water consumption, chemical consumption, emissions, corresponding time histories, transient performance of plant components, or margin to operational constraints.

7. The method of claim 1, further comprising automatically controlling the power plant based at least in part on the actionable operating information.

8. The method of claim 1 wherein generating the actionable operating information comprises using user selected performance criterion.

9. The method of claim 1 wherein operating the power plant based at least in part on the actionable operating information comprises sending a recommendation for consideration by a plant operator.

10. A system for predicting and controlling behavior associated with a power plant, the system comprising:
at least one memory for storing data and computer-executable instructions; and
at least one processor configured to access the at least one memory and further configured to execute the computer-executable instructions for:
modeling dynamics associated with a power plant;
modeling controls associated with the power plant;
receiving operating information associated with the power plant;
determining, by modeling the dynamics, a current operating state of the power plant based at least in part on the received operating information; and
predicting, by modeling the dynamics and controls, one or more future operating parameters associated with power plant based at least in part on the determined current operating state, the received operating information, and multiple controllable scenarios, wherein the multiple controllable scenarios include two or more of: time to start each generating unit in the power plant, time to start blending steam from different steam generation units in a common header, rate at which blending occurs, time to start rolling turbine shafts, acceleration rate to reach rated speed, timing of chemical dosing, magnitude of chemical dosing, time to start cooling fans, cooling fan speed, time to close a breaker, loading rate of one or more turbines, and time to transition switch operating modes;
generating actionable operating information based at least in part on the one or more future operating parameters.

11. The system of claim 10, wherein modeling the dynamics comprises representing physical operating parameters associated with the power plant with one or more of differential equations or differential algebraic equations.

12. The system of claim 10, wherein modeling controls comprises a modeling closed-loop behavior of at least one process associated with the power plant.

13. The system of claim 10, wherein the current operating state comprises one or more of temperatures, pressures, flows, enthalpies, voltage, reactive power, chemical compositions, mechanical torque, mechanical power, or speeds.

14. The system of claim 10, wherein receiving operating information comprises receiving one or more of configuration parameters, sensor information, pricing information, or environmental information.

15. The system of claim 10, wherein predicting the one or more future operating parameters comprises predicting one or more of: fuel consumption, life consumption, water consumption, chemical consumption, emissions, corresponding time histories, transient performance of plant components, or margin to operational constraints.

16. The system of claim 10, further comprising providing the actionable operating information to an operator.

17. The system of claim 10, further comprising automatically controlling the power plant based at least in part on the actionable operating information.

* * * * *